(12) United States Patent
Okano et al.

(10) Patent No.: US 11,336,441 B2
(45) Date of Patent: May 17, 2022

(54) COMMUNICATION TERMINAL, SERVER APPARATUS, AND PROGRAM

(71) Applicant: NIPPON TELEGRAPH AND TELEPHONE CORPORATION, Chiyoda-ku (JP)

(72) Inventors: Yuki Okano, Musashino (JP); Reo Yoshida, Musashino (JP); Ryo Nishimaki, Musashino (JP); Tetsutaro Kobayashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 99 days.

(21) Appl. No.: 16/758,936

(22) PCT Filed: Oct. 31, 2018

(86) PCT No.: PCT/JP2018/040472
§ 371 (c)(1),
(2) Date: Apr. 24, 2020

(87) PCT Pub. No.: WO2019/093201
PCT Pub. Date: May 16, 2019

(65) Prior Publication Data
US 2021/0184844 A1 Jun. 17, 2021

(30) Foreign Application Priority Data

Nov. 7, 2017 (JP) ............................. JP2017-214927

(51) Int. Cl.
*H04L 9/08* (2006.01)
*H04L 9/16* (2006.01)
*H04L 9/32* (2006.01)

(52) U.S. Cl.
CPC .......... *H04L 9/0861* (2013.01); *H04L 9/0819* (2013.01); *H04L 9/0891* (2013.01); *H04L 9/16* (2013.01); *H04L 9/3242* (2013.01)

(58) Field of Classification Search
CPC ............... H04L 12/66; H04L 2463/062; H04L 63/0281; H04L 63/0478; H04L 67/28;
(Continued)

(56) References Cited

U.S. PATENT DOCUMENTS 7,290,132 B2 * 10/2007 Aboba .................... H04L 63/04
713/153
7,356,688 B1 * 4/2008 Wang .................... H04L 9/3013
380/277

(Continued)

OTHER PUBLICATIONS

Search Query Report from IP.com (performed Dec. 17, 2021) (Year: 2021).*

(Continued)

*Primary Examiner* — Sharon S Lynch
(74) *Attorney, Agent, or Firm* — Oblon, McClelland, Maier & Neustadt, L.L.P.

(57) ABSTRACT

A communication terminal which is capable of reducing load of a server apparatus by reutilizing a message key to be used for encrypting a message is provided. The communication terminal includes a session key storage part which stores a session key which is shared with another communication terminal and which is not shared with the server apparatus, a message key generating part which generates a message key, a message key storage part which stores the message key to be reutilized in association with a message key identifier, a message encrypting part which generates a message encrypted text based on a common key cryptosystem using the message and the message key, a message key encrypting part which generates a message key encrypted text based on a common key cryptosystem which can (Continued)

perform re-encryption using the session key and the message key, and an encrypted text transmitting part which transmits a group identifier which is an identifier of a group to which an own terminal belongs, the message key encrypted text or the message key identifier, and the message encrypted text to the server apparatus.

2 Claims, 8 Drawing Sheets

(58) Field of Classification Search
 CPC ....... H04L 9/08; H04L 9/0819; H04L 9/0861; H04L 9/0891; H04L 9/16; H04L 9/3242
 See application file for complete search history.

(56) References Cited

U.S. PATENT DOCUMENTS

| | | | | |
|---|---|---|---|---|
| 7,706,540 | B2* | 4/2010 | Fransdonk | H04L 9/0825 380/279 |
| 7,869,591 | B1* | 1/2011 | Nagel | H04L 9/3249 380/28 |
| 8,291,237 | B2* | 10/2012 | Ostrovsky | G06F 16/24568 713/189 |
| 8,316,237 | B1* | 11/2012 | Felsher | H04L 9/0825 713/171 |
| 8,515,058 | B1* | 8/2013 | Gentry | H04L 9/008 380/28 |
| 8,630,422 | B2* | 1/2014 | Gentry | H04L 9/008 380/285 |
| 8,904,181 | B1* | 12/2014 | Felsher | H04L 63/0442 713/171 |
| 8,954,740 | B1* | 2/2015 | Moscaritolo | H04L 9/14 713/171 |
| 9,621,346 | B2* | 4/2017 | Gentry | H04L 9/38 |
| 9,716,590 | B2* | 7/2017 | Gentry | H04L 9/008 |
| 9,742,566 | B2* | 8/2017 | Gentry | H04L 9/16 |
| 2005/0008152 | A1* | 1/2005 | MacKenzie | H04L 9/0844 380/44 |
| 2005/0195975 | A1* | 9/2005 | Kawakita | H04L 9/0825 380/30 |
| 2009/0208004 | A1* | 8/2009 | Kawai | H04L 9/0825 380/45 |
| 2011/0110525 | A1* | 5/2011 | Gentry | H04L 9/14 380/285 |
| 2013/0170640 | A1* | 7/2013 | Gentry | H04L 9/3093 380/30 |
| 2013/0216044 | A1* | 8/2013 | Gentry | H04L 9/008 380/277 |
| 2016/0072781 | A1* | 3/2016 | Zhang | H04L 63/08 726/4 |
| 2016/0306966 | A1* | 10/2016 | Srivastava | G06F 21/31 |
| 2016/0380767 | A1* | 12/2016 | Hayashi | H04L 9/3073 380/45 |

OTHER PUBLICATIONS

International Search Report dated Jan. 29, 2019 in PCT/JP2018/040472 filed on Oct. 31, 208, 1 page.

Okano, Y. et al., "Searchable Symmetric Encryption with Proxy Re-Encryption in a Secure Business Chat," 2017 Symposium on Cryptography and Information Security (SCIS2017), 3F3-4, Jan. 2017, pp. 1-8, 14 total pages (with partial English translation).

"Group Chat for Business TopicRoom," NTT Software, https://www.ntt-tx.co.jp/products/topicroom/, Oct. 2017, 5 total pages (with partial English translation).

Kobayashi, T. et al., "Scalable and Dynamic Multi-Cast Key Distribution," 2016 Symposium on Cryptography and Information Security (SCIS2016), Jan. 2016, 4E2-3, pp. 1-7.

Boneh, D. et al., "Key Homomorphic PRFs and Their Applications," Cryptology ePrint Archive: Report 2015/220, 2015, pp. 1-41, 42 total pages.

Yoneyama, K. et al., "Multi-Cast Key Distribution: Scalable, Dynamic and Provably Secure Construction," Cryptology ePrint Archive: Report 2016/833, http://eprint.iacr.org/2016/833, 2016, 28 total pages.

* cited by examiner

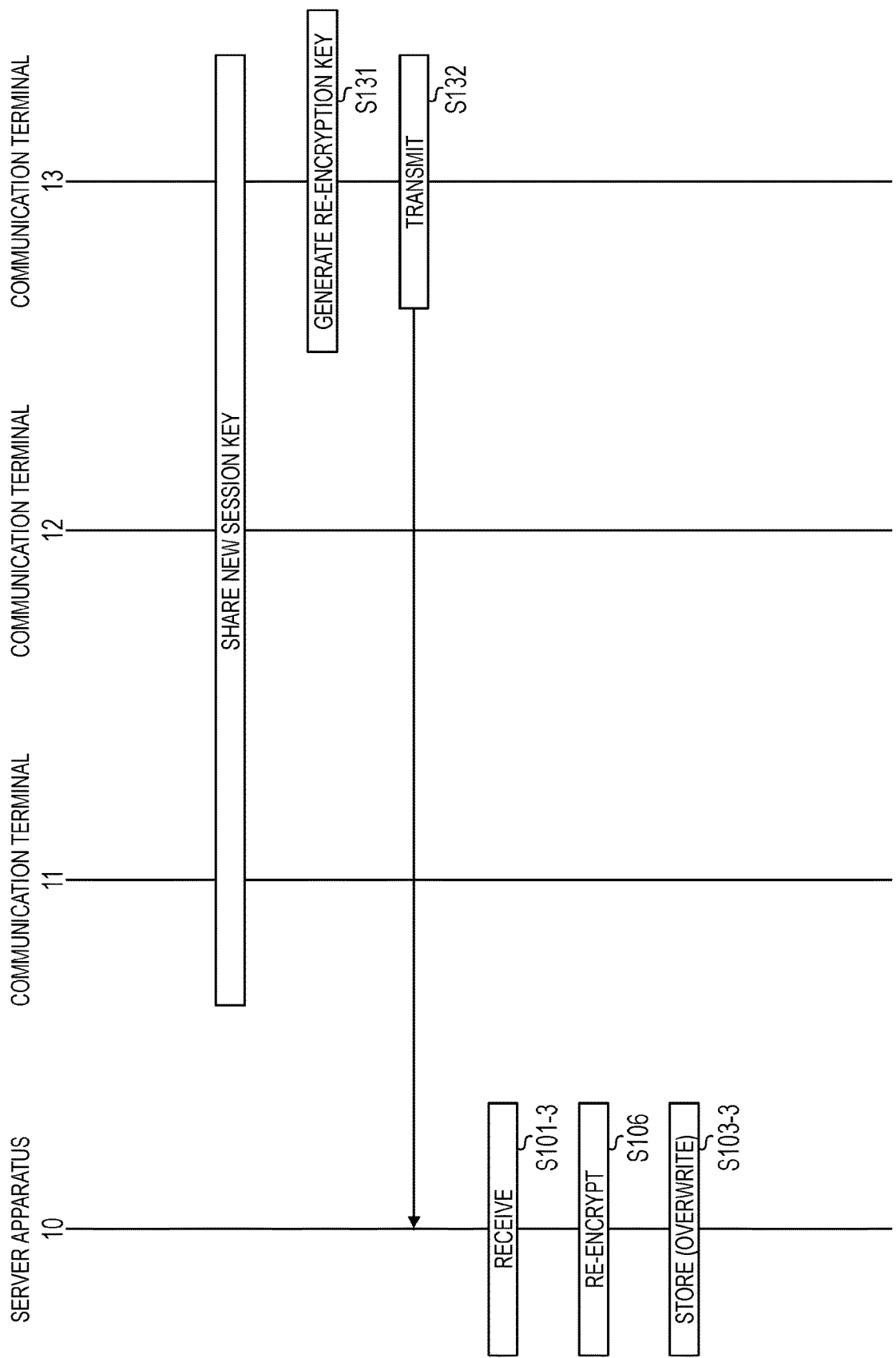

COMMUNICATION TERMINAL, SERVER APPARATUS, AND PROGRAM

TECHNICAL FIELD

The present invention relates to a communication terminal, a server apparatus, and a program.

BACKGROUND ART

As a message transmitting system assuming usage in business, there exists a system which can support multiple devices such as a personal computer and a smartphone. The system which can support multiple devices includes a cloud-based message transmitting system in which data is not left at a communication terminal in view of leakage of confidential information at a company. Examples of the cloud-based message transmitting system can include one disclosed in Non-patent literature 1.

In such a message transmitting system, tapping on a communication path is prevented by a communication channel being encrypted, and, as described above, leakage of information due to a communication terminal being lost or illegally taken out is prevented by data being not left at the communication terminal. In this manner, while a conventional message transmitting system deals with threats to a "communication path" and a "communication terminal", threats to a server apparatus are not sufficiently dealt with.

Examples of the threats to the server apparatus described here can include an "attack on the server apparatus from outside", an "internal fraud by a server administrator, or the like", or the like. It is possible to take a measure of encrypting a message and storing the encrypted message, to deal with these threats. However, as long as a message can be decrypted on the server apparatus side, there remains a possibility of leakage of a message from the server apparatus, for the above-described threats. It is important that a message to be transmitted to the server apparatus which transmits, receives and stores the message is kept concealed from the server apparatus (is not tapped on the server apparatus side).

As one method, it is possible to realize end-to-end encrypted communication in which a message is kept concealed from the server apparatus, and the message can be decrypted only at a communication terminal. In this case, how to share a common key to be used between communication terminals becomes a problem. A solution to this problem is, for example, disclosed in Non-patent literature 2. Non-patent literature 2 proposes protocol for sharing a key (hereinafter, a session key) between users without leaking any information to an authentication server in a star network in which the authentication server is located at the center.

By this means, communication terminals can perform communication with each other while a message is kept concealed from the server apparatus. Further, because a session key is shared so that only communication terminals which are currently taking part in communication can read the message, the session key is updated by an event such as addition and deletion of a user.

PRIOR ART LITERATURE

Non-Patent Literature

Non-patent literature 1: NTT Software, "Group Chat for Business TopicRoom", [online], NTT Software, [retrieved on Oct. 18, 2017], Internet, <URL: https://www.ntt-tx.co.jp/products/topicroom/>

Non-patent literature 2: Tetsutaro Kobayashi, Kazuki Yoneyama, Reo Yoshida, Yuto Kawahara, Hitoshi Fuji, Tomohide Yamamoto, "Scalable and Dynamic Multi-Cast Key Distribution", SCIS2016—Symposium on Cryptography and Information Security—collection of papers, The Institute of Electronics, Information and Communication Engineers, 2016, January, 4E2-3

SUMMARY OF THE INVENTION

Problems to be Solved by the Invention

According to the technique of the above-described Non-patent literature 2, it is possible to perform communication while a message is kept concealed from a server apparatus by sharing a session key between communication terminals so as not to be known to the server apparatus. However, in a communication system as described above, there is a case where other processing may occur on the server apparatus in coordination with updating of the session key, and there is a possibility that load of the server apparatus may increase. Particularly, in a system in which real time is required, like a group chat system, it is not desirable that it takes time in processing on the server apparatus.

Therefore, the present invention is directed to providing a communication terminal which can reduce load of a server apparatus by reutilizing a message key to be used for encrypting a message.

Means to Solve the Problem

A communication terminal of the present invention is a communication terminal which transmits an encrypted text to another communication terminal via a server apparatus, the communication terminal including a session key storage part, a determining part, a message key generating part, a message key storage part, a message encrypting part, a message key encrypting part and an encrypted text transmitting part.

The session key storage part stores a session key which is shared with the other communication terminal and which is not shared with the server apparatus. The determining part determines to newly generate a message key to be used for encrypting a message in a case where transmission of the encrypted text is first transmission after the session key is generated or updated, and, otherwise, determines to reutilize the message key. The message key generating part generates a message key in a case where a result of the determination is to newly generate a message key. The message key storage part stores the message key to be reutilized in association with a message key identifier in a case where a result of the determination is to reutilize the message key. The message encrypting part generates a message encrypted text based on a common key cryptosystem using the message and the generated or stored message key. The message key encrypting part generates a message key encrypted text based on a common key cryptosystem which can perform re-encryption using the session key and the generated message key in a case where the result of the determination is to newly generate a message key. The encrypted text transmitting part transmits a group identifier which is an identifier of a group to which an own terminal belongs, a message key encrypted text, and a message encrypted text to the server apparatus in a case where the result of the determination is to newly generate a message key, and transmits the group identifier, a message key identifier and the message encrypted text to the server apparatus in a case where the result of the determination is to reutilize the message key.

Effects of the Invention

According to the communication terminal of the present invention, it is possible to reduce load of the server apparatus by reutilizing a message key to be used for encrypting a message.

BRIEF DESCRIPTION OF THE DRAWINGS

FIG. 8 is a sequence diagram illustrating re-encryption operation in the first embodiment.

DETAILED DESCRIPTION OF THE EMBODIMENTS

Figure 1:
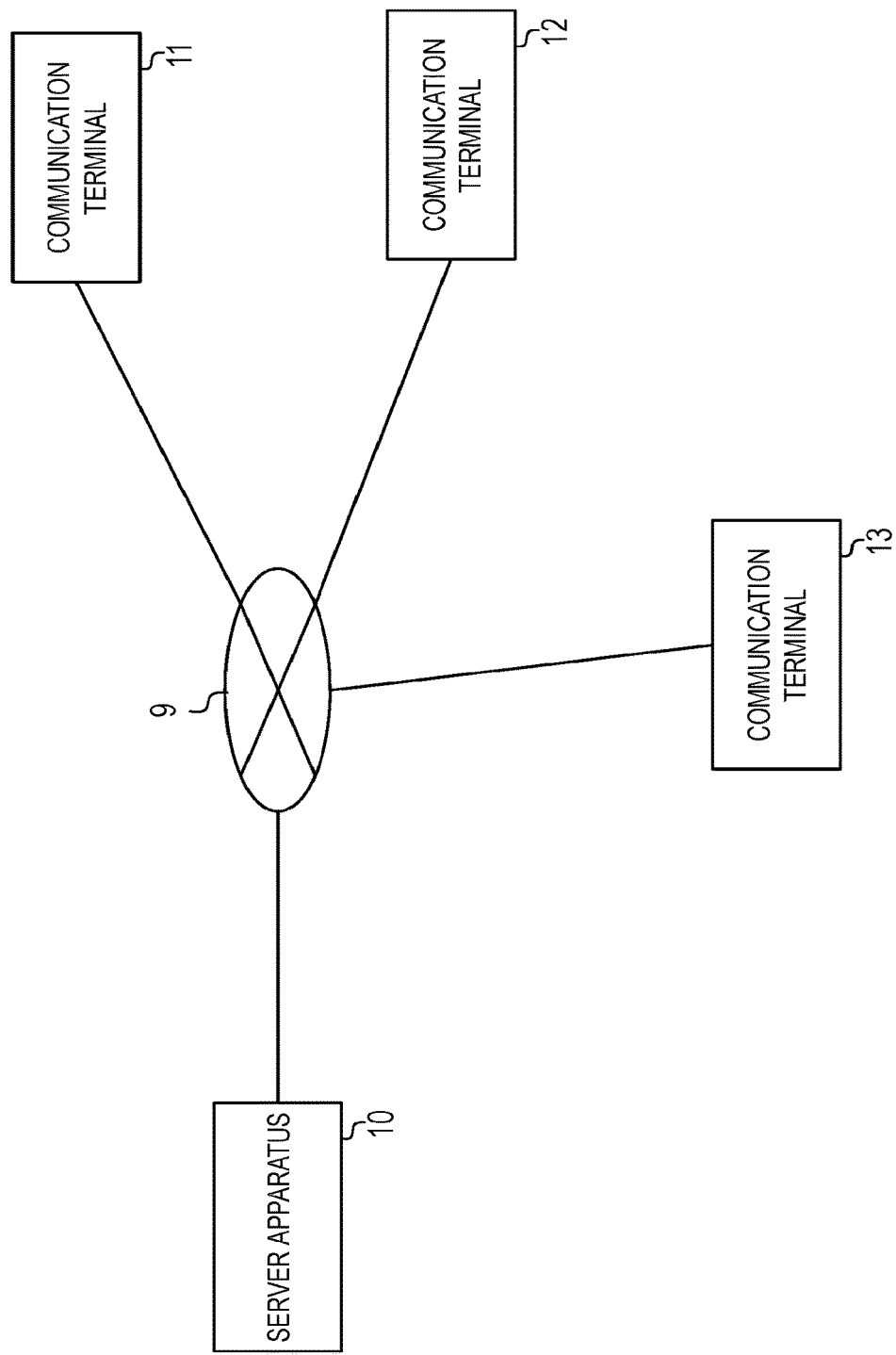
FIG. 1 is a block diagram illustrating a configuration of a communication system in a first embodiment.

An embodiment of the present invention will be described in detail below. Note that the same reference numerals will be assigned to components having the same function, and overlapped description will be omitted.

First Embodiment

<Outline>

In a communication system in a first embodiment, a common key cryptosystem is used for encrypting a message. A key to be utilized for encrypting a message (hereinafter, a message key) is encrypted with a session key by utilizing a common key cryptosystem which can perform re-encryption. At this time, instead of a message key being generated for each encryption of each message, the same message key is used after a session key is updated until the session key is updated next. While, in the server apparatus, an encrypted text of a message (hereinafter, a message encrypted text) and an encrypted text of a message key (hereinafter, a message key encrypted text) are respectively stored in different tables (storage parts), an identifier of a key (key ID) is added so as to allow the server apparatus side to know which message key is used for which message, and the message encrypted text and the message key encrypted text are stored in different tables (storage parts) using this key ID as a key. When re-encryption processing is performed, the server apparatus updates only the table (storage part) in which the message key encrypted text is stored. Because a plurality of message encrypted texts are associated with one message key encrypted text with a key ID, the number of targets to be re-encrypted is reduced, so that load of the server apparatus during re-encryption processing is reduced. Note that, because the message is never decrypted during re-encryption processing, the server apparatus performs re-encryption processing without knowing content of the message. Further, when a plurality of messages are acquired at the same time for log-in, participation in a group, or the like, it is possible to reduce decryption processing by decrypting the message key in advance, temporarily storing the decrypted message key and decrypting the message with a message key corresponding to the key ID associated with the message encrypted text.

<Preparation>

A set N is set as a set of the whole positive integers. $Kspace_1$ and $Kspace_2$ are set as key space. A common key cryptosystem which can perform re-encryption includes the following four types of algorithm (KEM.Enc, KEM.Dec, KEM.ReKeyGen, KEM.ReEnc), which respectively have the following input and output.

$KEM.Enc(SK_{i1}, K) \to C_1^{(i1)}$

Algorithm in which original $Sk_{i1}$ of $Kspace_1$ and original K of $Kspace_2$ are input, and an encrypted text $C_1^{(i1)}$ is output $KEM.Dec(SK_j, C_1^{(i)}) \to K'$ Algorithm in which original $SK_j$ of $Kspace_1$ and an encrypted text $C_1^{(i)}$ are input and original K' of $Kspace_2$ is output $KEM.ReKeyGen(SK_{i1}, SK_{i2}) \to RK_{i1,i2}$ Algorithm in which two original $SK_{i1}$ and $SK_{i2}$ of $Kspace_1$ are input and a re-encryption key $RK_{i1,i2}$ is output $KEM.ReEnc(RK_{i1,i2}, C_1^{(i1)}) \to C_1^{(i2)}$ Algorithm in which the re-encryption key $RK_{i1,i2}$ and an encrypted text $C_1^{(i1)}$ are input, and a re-encrypted text $C_1^{(i2)}$ is output Further, it is assumed that the above-described algorithm satisfies the following two conditions.

(1) For arbitrary original SK of $Kspace_1$ and arbitrary original K of $Kspace_2$, $KEM.Dec(SK, KEM.Enc(SK, K)) = K$ (2) For an arbitrary integer $n > 1$, a sequence $SK_1, \ldots, SK_n$ of an arbitrary key of $Kspace_1$, a sequence $RK_{1,2}, RK_{n-1,n}$ of a re-encryption key output by $KEM.ReKeyGen(Sk_i, Sk_{i+1})$ for arbitrary $i \in \{1, \ldots, n-1\}$, and arbitrary $i_1, i_2$ which satisfy arbitrary original $K, 1 \le i_1 < i_2 \le n$ of $Kspace_1$, $KEM.Dec(SK_{i2}, KEM.ReEnc(RK_{i2-1,i2}, \ldots, KEM.ReEnc(RK_{i1,i1+1}, KEM.Enc(SK_{i1}, K)))) = K$ Examples of the re-encryption scheme which satisfies the above can include a scheme of reference non-patent literature 1. (Reference non-patent literature 1: D. Boneh, K. Lewi, H. Montgomery, and A. Raghunathan. 2015.Key Homomorphic PRFs and Their Applications. Cryptology ePrint Archive, Report 2015/220. (2015).)

This is constituted as follows. First, q is set as a prime number, $Z_q$ is set as a residue ring modulo q for a ring of integers Z. G is set as a cyclic group of order q, and $Kspace_2 = G$. While the cyclic group G is considered as a multiplicative group, the cyclic group G may be considered as an additive group. Further, $Kspace_1 = Z_q$. Still further, Rand is set as random space, and $H: Rand \to G$ is set as a hash function in which Rand is set as a domain and G is set as a range. A function $F: Kspace \times Rand \to G$ in which a direct product of $Kspace_1 = Z_q$ and Rand is set as a domain and G is set as a range, is defined with $F(SK, r) = H(r)^{SK}$.

$KEM.Enc(SK_{i1}, K) \to C_1^{(i1)}$ $r \in Rand$ is uniformly and randomly extracted, and $C_1^{(i1)} = (r, K + F(SK, r))$ is output.

$KEM.Dec(SK_j, C_1^{(i)}) \to K'$ $C_1^{(i)}$ is resolved as $(r, C)$, and $K' = C - F(SK, r)$ is output.

KEM.ReKeyGen($SK_{i1}$, $SK_{i2}$)→$RK_{i1,i2}$
$RK_{i1,i2}$=$SK_{i2}$−$SK_{i1}$ is output.
KEM.ReEnc($RK_{i1,i2}$, $C_1^{(i1)}$)→$C_1^{(i2)}$
$C_1^{(i1)}$ is resolved as (r, C), and $C_1^{(i2)}$=(r, C+F($RK_{i1,i2}$,r)) is output.

Note that, while reference non-patent literature 1 has been described as an example of the encryption scheme which can perform re-encryption (KEM.Enc, KEM.Dec, KEM.ReKeyGen, KEM.ReEnc), an encryption scheme which can perform re-encryption may be realized with methods other than the above-described method, and is not particularly limited.

The common key cryptosystem includes the following two types of algorithm (Enc, Dec), which respectively have the following input and output.

Enc(K, m)→$C_2$
Algorithm in which original K of $Kspace_2$ and a message m are input, and an encrypted text $C_2$ is output
Dec(K, $C_2$)→m
Algorithm in which original K of $Kspace_2$ and an encrypted text $C_2$ are input, and a message in is output Further, the above-described algorithm satisfies the following condition.
Dec(K, Enc(K, m))=m for arbitrary original K of $Kspace_2$ and an arbitrary message m.

While examples of the encryption scheme which satisfies the above condition include AES, Camellia, or the like, the encryption scheme is not limited here.

As illustrated in FIG. 1, the communication system 1 in the present embodiment includes a server apparatus 10, a communication terminal 11, a communication terminal 12 and a communication terminal 13, and the respective apparatuses are connected with a network 9 so as to be able to perform communication. While the communication terminal 11, the communication terminal 12 and the communication terminal 13 can be realized with a personal computer, a smartphone, or the like, the configuration is not particularly limited.

In the following description, it is assumed that the communication terminal 11 is a terminal which is in charge of encrypting a message and transmitting the encrypted message, or the like, the communication terminal 12 is a terminal which is in charge of receiving the encrypted message, or the like, and decrypting the encrypted message, or the like, and the communication terminal 13 is a terminal which is in charge of generating and transmitting a re-encryption key which will be described later. However, because the above is allocation for explanatory convenience, it is also possible to realize, for example, a communication terminal having all functions of the communication terminal 11, the communication terminal 12 and the communication terminal 13.

Note that, in the communication system 1 in the present embodiment, it is possible to form a group of users who send chat messages to each other. An identifier is provided to each group. Users of the communication terminal 11, the communication terminal 12 and the communication terminal 13 are respectively set as a user A, a user B and a user C. It is assumed that the user A, the user B and the user C belong to groups having group identifiers group IDs, and each communication terminal stores the group ID.

Further, the session key will be described. The session key refers to a key shared among communication terminals to be utilized by users belonging to a group for each group. While there is reference non-patent literature 2 as protocol for sharing a key without leaking any information regarding the session key to apparatuses other than the communication terminal, for example, the server apparatus 10, a session key sharing method is not particularly limited.

(Reference non-patent literature 2: K. Yoneyama, R. Yoshida, Y. Kawahara, T. Kobayashi, H. Fuji, and T. Yamamoto, 2016, Multi-Cast Key Distribution, Scalable, Dynamic and Provably Secure Construction, Cryptology ePrint Archive, Report 2016.833, (2016))

Note that, to securely share the session key, the session key is generated/updated every time a user is added to a group, a user leaves a group, a certain period elapses, and a user logs in/logs out.

<Details of Respective Apparatuses Constituting Communication System 1>

Figure 2:
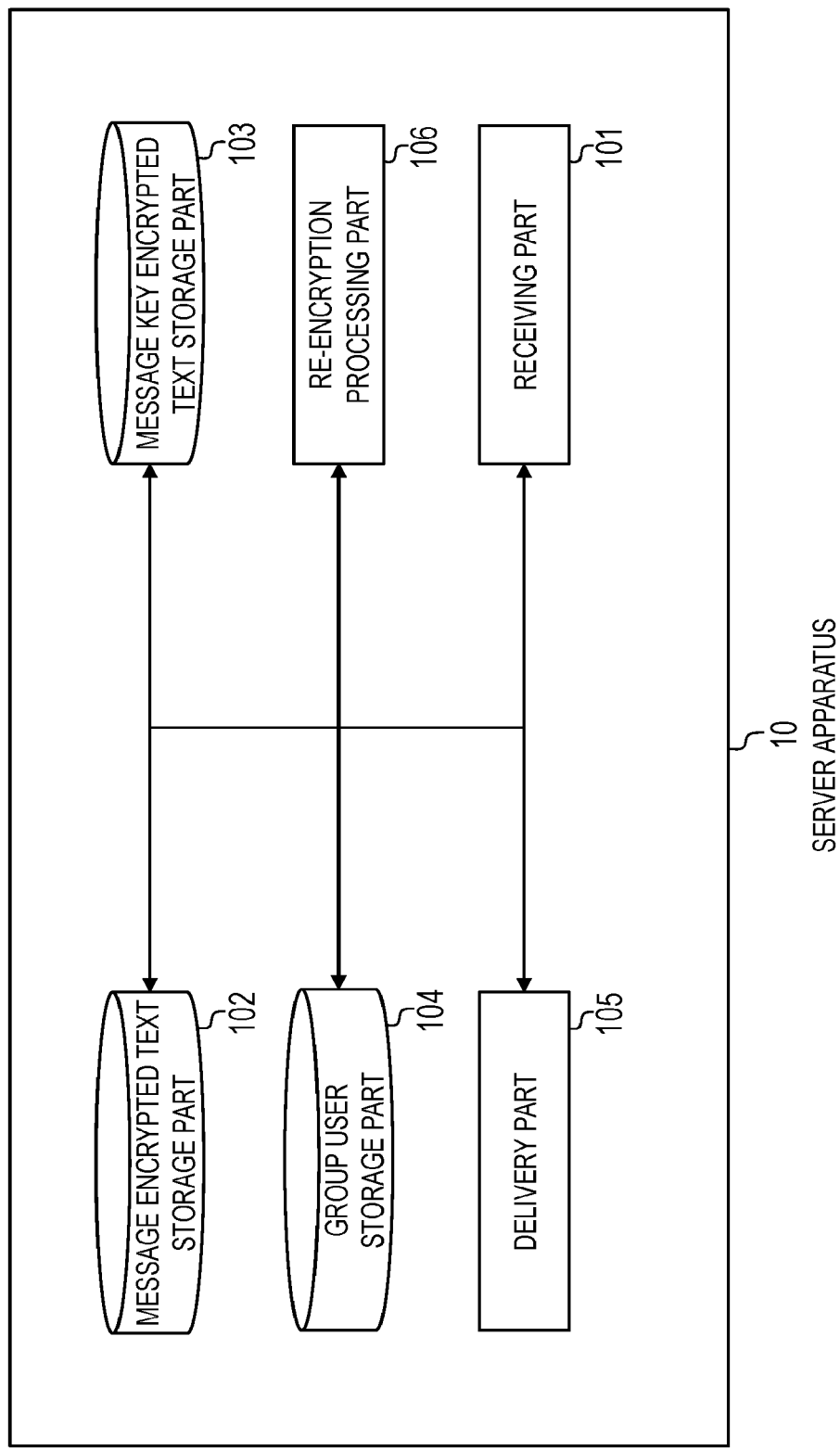
FIG. 2 is a block diagram illustrating a configuration of a server apparatus in the first embodiment.
Figure 3:
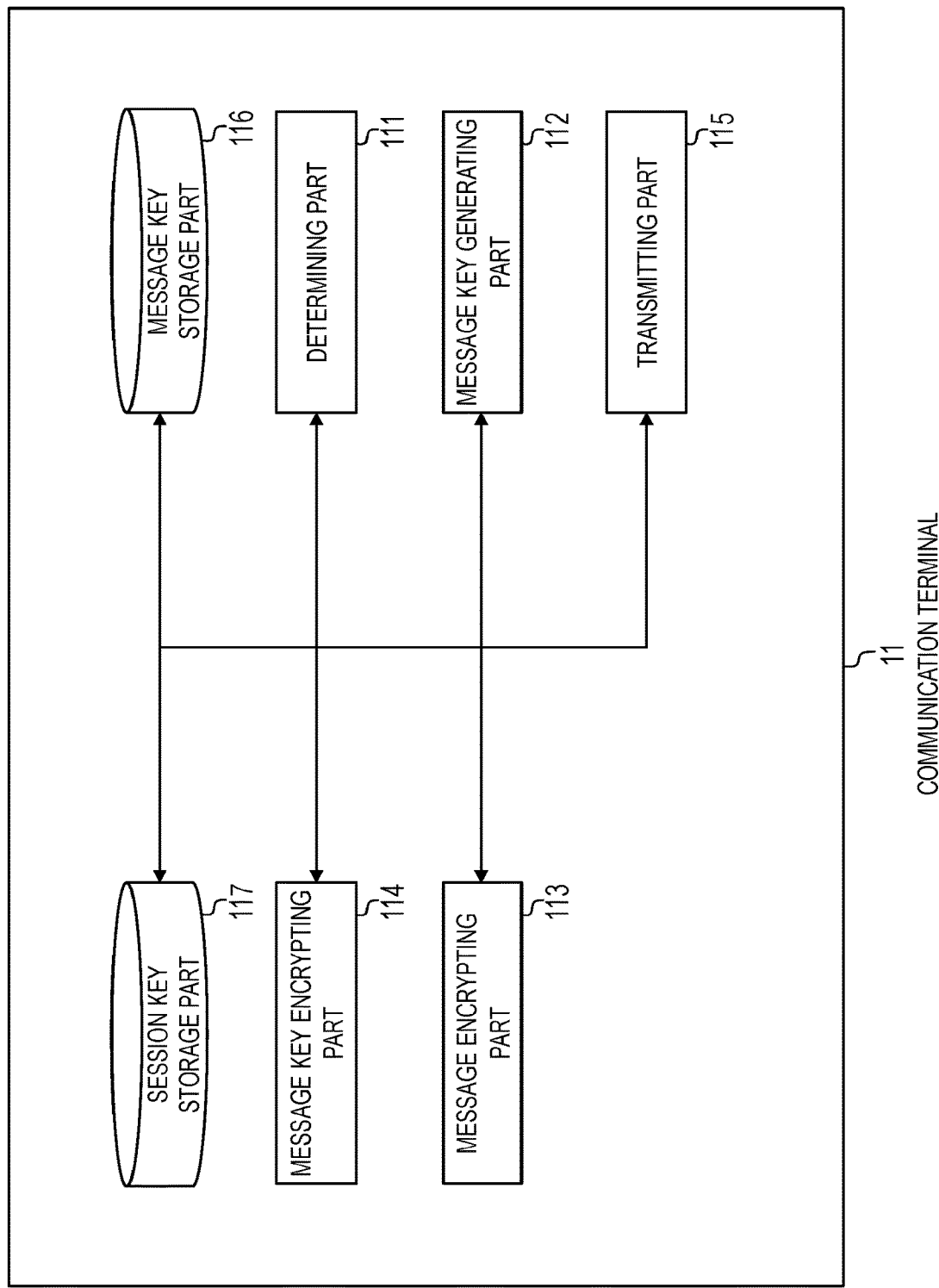
FIG. 3 is a block diagram illustrating a configuration of a communication terminal which performs message transmission operation in the first embodiment.
Figure 4:
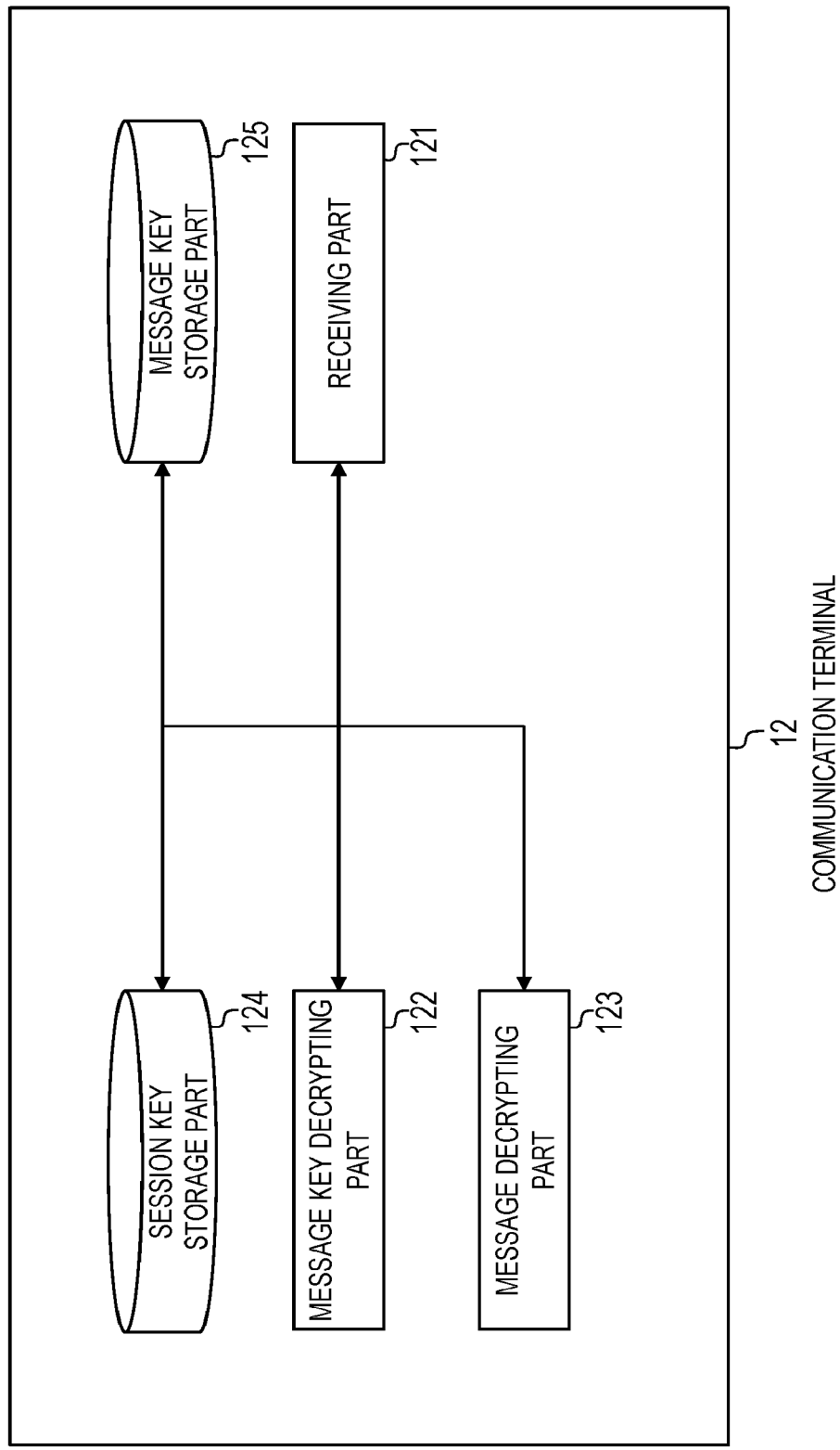
FIG. 4 is a block diagram illustrating a configuration of a communication terminal which performs message reception operation in the first embodiment.
Figure 5:
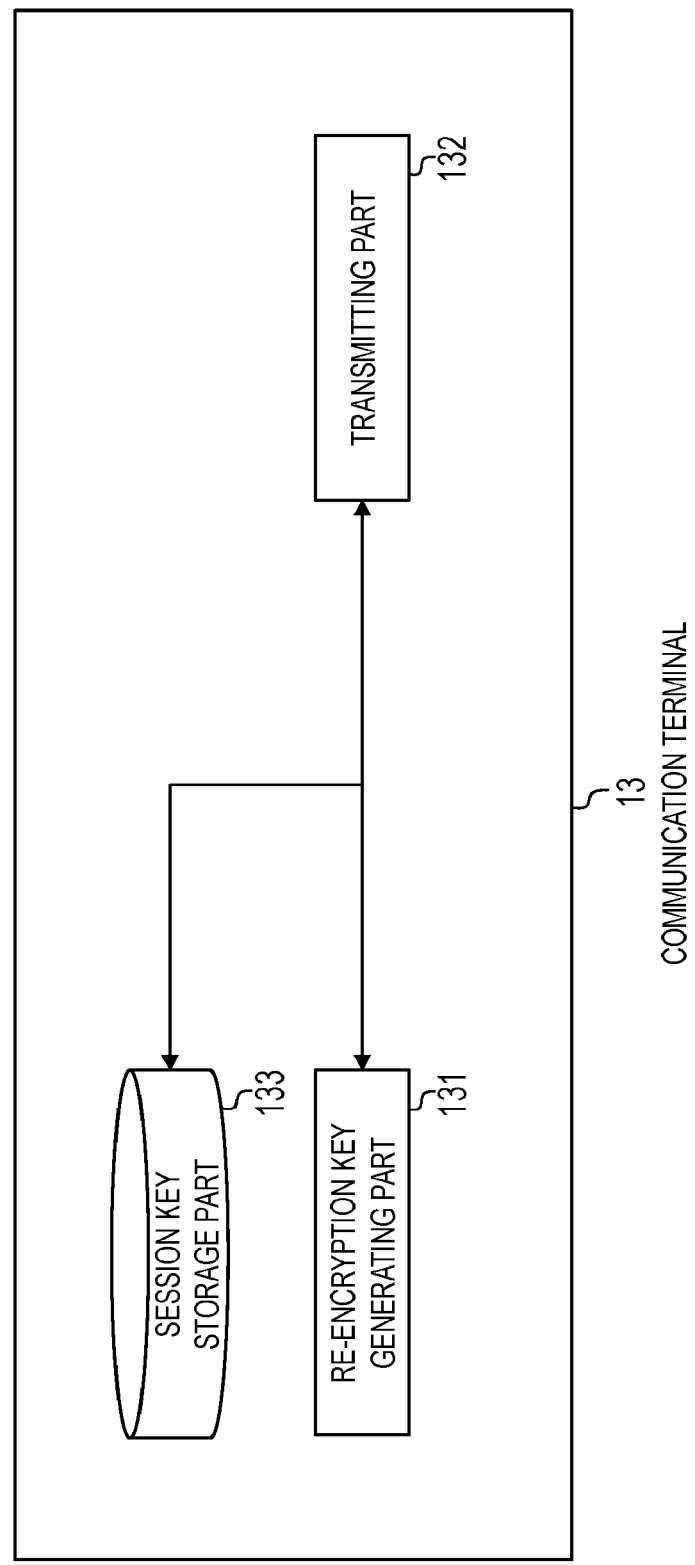
FIG. 5 is a block diagram illustrating a configuration of a communication terminal which performs re-encryption key transmission operation in the first embodiment.

As illustrated in FIG. 2, the server apparatus 10 includes a receiving part 101, a message encrypted text storage part 102, a message key encrypted text storage part 103, a group user storage part 104, a delivery part 105 and a re-encryption processing part 106. Further, as illustrated in FIG. 3, the communication terminal 11 includes a determining part 111, a message key generating part 112, a message encrypting part 113, a message key encrypting part 114, a transmitting part 115, a message key storage part 116, and a session key storage part 117. Further, as illustrated in FIG. 4, the communication terminal 12 includes a receiving part 121, a message key decrypting part 122, a message decrypting part 123, a session key storage part 124, and a message key storage part 125. Still further, as illustrated in FIG. 5, the communication terminal 13 includes a re-encryption key generating part 131, a transmitting part 132, and a session key storage part 133.

<Determination>

Operation of the respective apparatuses of the communication system 1 of the present embodiment will be described below with reference to FIG. 6, FIG. 7 and FIG. 8. First, it is assumed that the user A transmits a message in in a form of an encrypted text, to a group specified with a group identifier group ID using the communication terminal 11. Note that, it is assumed that the respective communication terminals (the communication terminal 11, the communication terminal 12, the communication terminal 13) share the latest session key $SK_1$, and hold the latest session key $SK_1$ respectively in the session key storage part 117, the session key storage part 124 and the session key storage part 133. Because this session key $SK_1$ is not shared with the server apparatus 10, the server apparatus 10 does not know the session key $SK_1$.

When the determining part 111 of the communication terminal 11 transmits (the encrypted text) of the message m, the determining part 111 of the communication terminal 11 determines whether or not transmission of (the encrypted text of) the message m is first transmission after the session key $SK_1$ is generated or updated (S111). In a case where transmission of (the encrypted text of) the message m is the first transmission after the session key $SK_1$ is generated or updated, the determining part 111 determines to newly generate a message key (determination=true), and, otherwise, determines to reutilize the message key (determination=false).

<Operation of Communication Terminal 11 in a Case where Determination is True>

Figure 6:
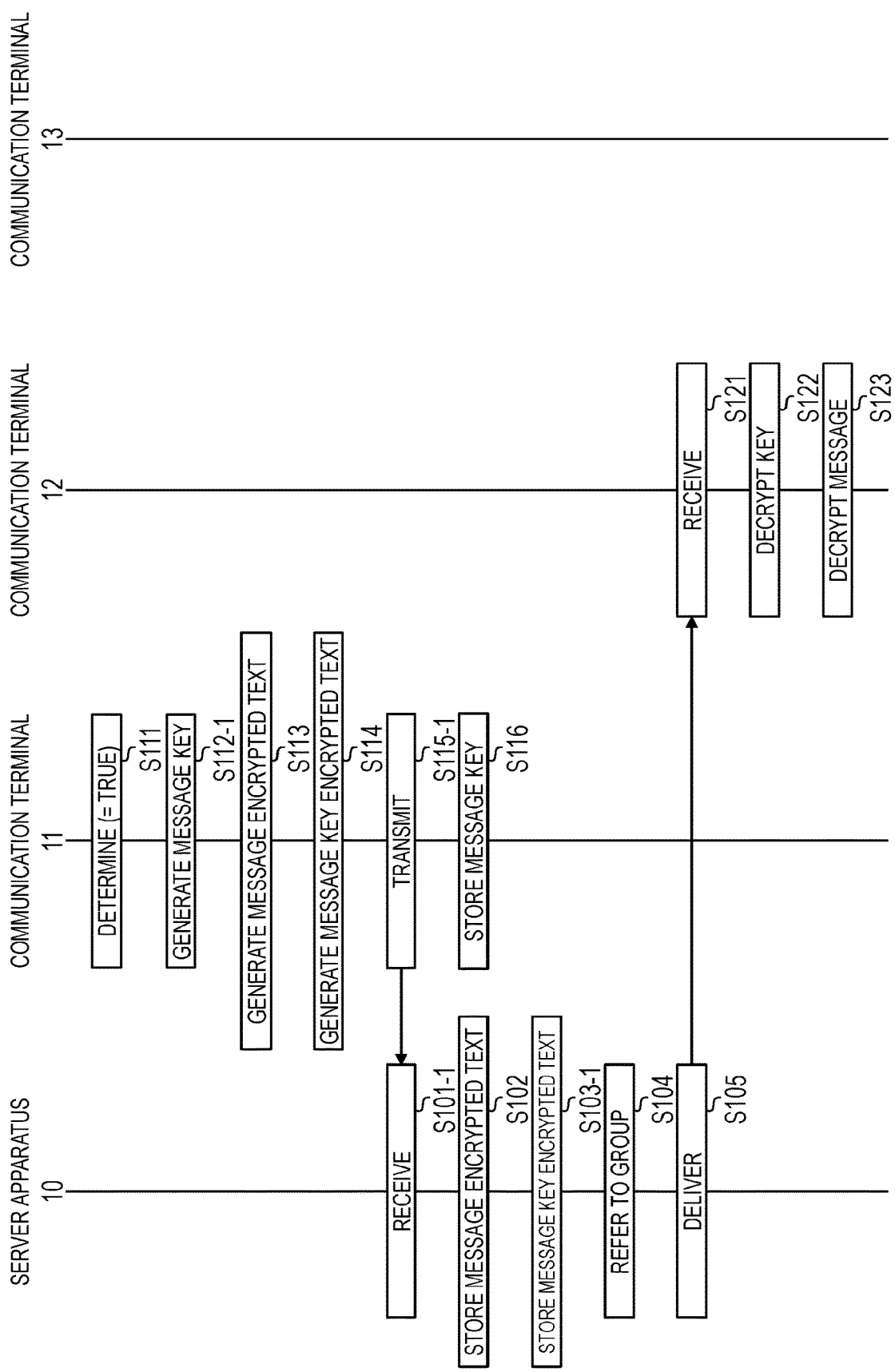
FIG. 6 is a sequence diagram illustrating message delivery operation (determination=true) in the first embodiment.

As illustrated in FIG. 6, the message key generating part 112 of the communication terminal 11 generates original $K_1$ (message key) of $Kspace_2$ (S112-1).

The message encrypting part 113 of the communication terminal 11 generates a message encrypted text $C_{2,m}$←Enc($K_{1,m}$) based on the common key cryptosystem using the message m and the generated message key $K_1$ (S113).

Further, the message key encrypting part 114 of the communication terminal 11 generates a message key encrypted text $C^{(1)}_{1,K1} \leftarrow \text{KEM.Enc}(SK_1, K_1)$ based on the common key cryptosystem which can perform re-encryption using the session key $SK_1$ and the generated message key $K_1$ (S114).

The transmitting part 115 of the communication terminal 11 transmits a group identifier group ID which is an identifier of a group to which the own terminal belongs, the message key encrypted text $C^{(1)}_{1,K1}$, the message encrypted text $C_{2,m}$, that is, (group ID, $C^{(1)}_{1,K1}$, $C_{2,m}$) to the server apparatus 10 (S115-1).

Note that $K_{1,m}$ is provided to $(C^{(1)}_{1,K1}, C_{2,m})$ for convenience sake only to distinguish from other messages and encrypted texts of other message keys, and the message key $K_1$ and the message m are not inferred from the encrypted text.

While the communication terminal 11 stores the message key $K_1$ in the message key storage part 116 after transmitting a message to the server apparatus 10, it is assumed that a message key identifier Key $ID_1$ is allocated to the message key $K_1$ at this time point. It is desirable that the message key $K_1$ itself is not identified from the message key identifier Key $ID_1$. While examples of a method for generating an identifier can include a method in which an output value when the message key $K_1$ is input to a SHA256 hash function is set as an identifier using the SHA256 hash function, or the like, the method is not particularly limited.

Further, while the message key identifier Key $ID_1$ may be generated by the communication terminal 11, or Key $ID_1$ may be generated for the message key encrypted text when the server apparatus 10 receives a message, and attached and transmitted when the communication terminal 11 is notified of reception of the message, generation and transmission of the message key identifier Key $ID_1$ are not limited.

The message key storage part 116 of the communication terminal 11 stores the message key $K_1$ and the message key identifier Key $ID_1$ of the message key $K_1$ (S116). The stored message key $K_1$ is reutilized in a case where it is determined to reutilize the message key in the above-described determination (determination=false).

<Operation of Communication Terminal 11 in a Case where Determination is False>

Figure 7:
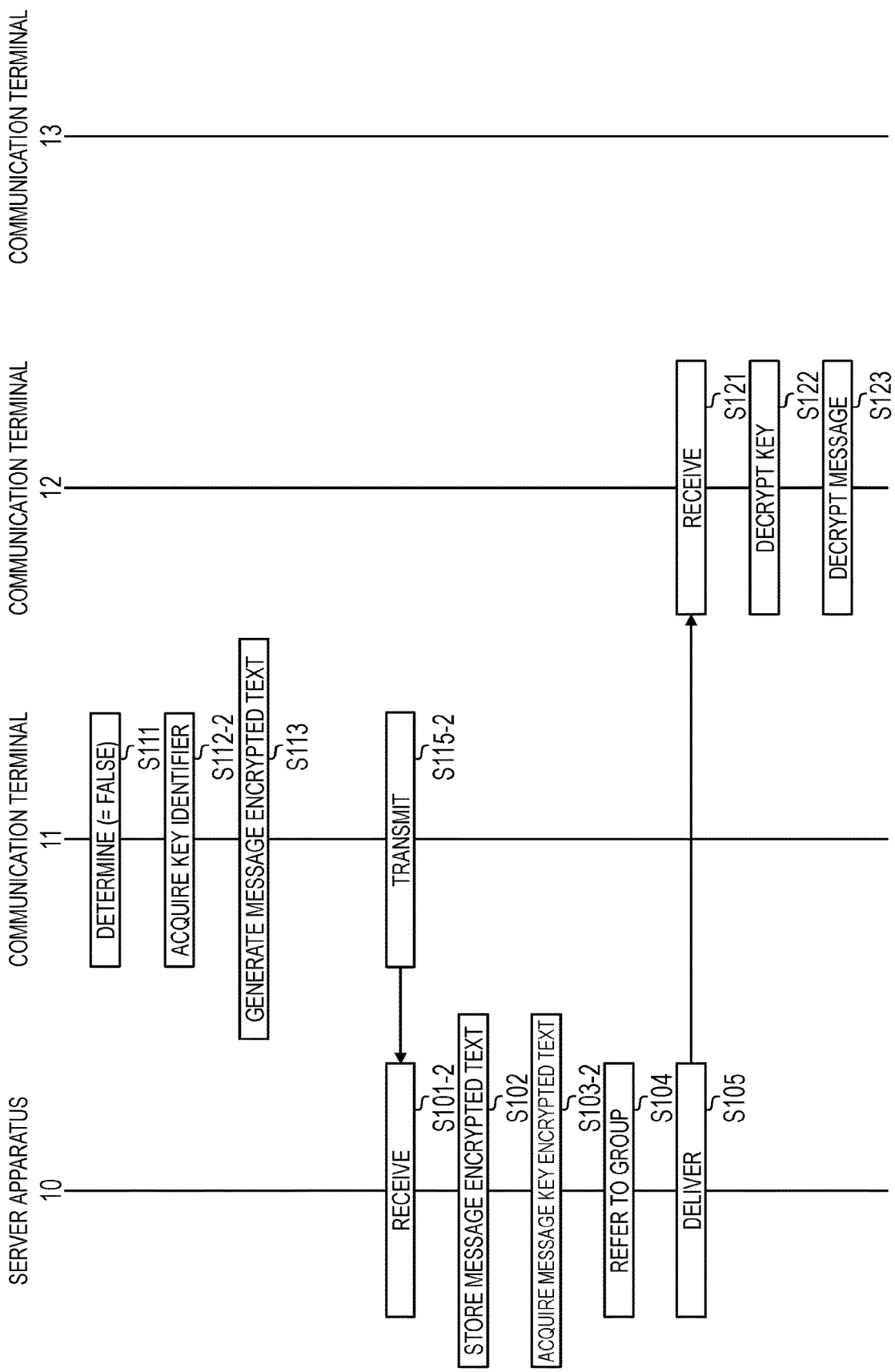
FIG. 7 is a sequence diagram illustrating message delivery operation (determination=false) in the first embodiment.

In this case, as illustrated in FIG. 7, the message key generating part 112 of the communication terminal 11 acquires the message key $K_1$ and the message key identifier Key $ID_1$ from the message key storage part 116 (S112-2). This message key $K_1$ is a message key used for encrypting the message m upon at least previous message transmission.

The message encrypting part 113 of the communication terminal 11 generates the message encrypted text $C_{2,m} \leftarrow \text{Enc}(K_{1,m})$ based on the common key cryptosystem using the message m and the message key $K_1$ stored in the message key storage part 116 (S113).

The transmitting part 115 of the communication terminal 11 transmits the group identifier group ID, the message key identifier Key $ID_1$, the message encrypted text $C_{2,m}$, that is, (group ID, Key $ID_1$, $C_{2,m}$) to the server apparatus 10 (S115-2).

Operation when the server apparatus 10 receives the message encrypted text $C_{2,m}$ from the communication terminal 11 will be described below. Note that, while description is provided such that operation of delivery to another communication terminal is performed by being triggered by reception of a message, there is a case where the server apparatus 10 delivers the stored encrypted message to the communication terminal in response to addition and log-in of a user, and requests from other communication terminals.

<Operation of Server Apparatus 10 in a Case where Determination is True>

That is, a case where determination is true corresponds to a case where a form of a message transmitted from the communication terminal 11 is (group ID, $C^{(1)}_{1,K1}$, $C_{2,m}$). As illustrated in FIG. 6, the receiving part 101 of the server apparatus 10 receives (group ID, $C^{(1)}_{1,K1}$, $C_{2,m}$) from the communication terminal 11 (S101-1).

The message encrypted text storage part 102 of the server apparatus 10 stores the message key identifier Key $ID_1$, the message encrypted text $C_{2,m}$, that is, (Key $ID_1$, $C_{2,m}$) (S102).

Further, the message key encrypted text storage part 103 of the server apparatus 10 stores the message key identifier Key $ID_1$, and the message key encrypted text $C^{(1)}_{1,K1}$, that is, (Key $ID_1$, $C^{(1)}_{1,K1}$) (S103-1). Note that the server apparatus 10 executes the above-described operation (S101-1, S102, S103-1) every time the server apparatus 10 receives data in a form of (group ID, $C^{(1)}_{1,K1}$, $C_{2,m}$).

The server apparatus 10 refers to information of users (including the users B and C) belonging to a group corresponding to the group ID, stored in the group user storage part 104 (S104). The delivery part 105 of the server apparatus 10 transmits (delivers) the message key encrypted text $C^{(1)}_{1,K1}$, and the message encrypted text $C_{2,m}$, that is, $(C^{(1)}_{1,K1}, C_{2,m})$ to the respective users belonging to the group corresponding to the group ID (S105). Note that, in the present embodiment, the server apparatus 10 transmits (delivers) $(C^{(1)}_{1,K1}, C_{2,m})$ to the communication terminal 12.

<Operation of Server Apparatus 10 in a Case where Determination is False>

That is, a case where determination is false corresponds to a case where a form of the message transmitted from the communication terminal 11 is (group ID, Key $ID_1$, $C_{2,m}$). As illustrated in FIG. 7, the receiving part 101 of the server apparatus 10 receives (group ID, Key $ID_1$, $C_{2,m}$) from the communication terminal 11 (S101-2).

The message encrypted text storage part 102 of the server apparatus 10 stores the message key identifier Key $ID_1$, and the message encrypted text $C_{2,m}$, that is, (Key $ID_1$, $C_{2,m}$) (S102). Note that, it is assumed that the server apparatus 10 executes the above-described operation (S101-2, S102) every time the server apparatus 10 receives data in a form of (group ID, Key $ID_1$, $C_{2,m}$).

The message key encrypted text storage part 103 of the server apparatus 10 acquires the message key encrypted text $C^{(1)}_{1,K1}$ associated with Key $ID_1$ (S103-2).

The server apparatus 10 refers to information of users (including the users B and C) belonging to a group corresponding to the group ID, stored in the group user storage part 104 (S104). The delivery part 105 of the server apparatus 10 transmits (delivers) the message key encrypted text $C^{(1)}_{1,K1}$, and the message encrypted text $C_{2,m}$, that is, $(C^{(1)}_{1,K1}, C_{2,m})$ to the respective users belonging to the group corresponding to the group ID (S105). Note that, in the present embodiment, the server apparatus 10 transmits (delivers) $(C^{(1)}_{1,K1}, C_{2,m})$ to the communication terminal 12.

<Operation of Communication Terminal 12>

Operation of the communication terminal 12 will be described below with reference to FIG. 6 (FIG. 7). As described above, the session key storage part 124 stores the latest session key $SK_1$ which is shared with other communication terminals and which is not shared with the server apparatus.

The receiving part 121 of the communication terminal 12 receives the message key encrypted text $C^{(1)}_{1,K1}$, and the message encrypted text $C_2,m$, that is, $(C^{(1)}_{1,K1}, C_{2,m})$ from the server apparatus 10 (S121).

The message key decrypting part 122 of the communication terminal 12 calculates $K_1 \leftarrow \text{KEM.Dec}(SK_1, C^{(1)}_{1,K1})$ from the latest session key $SK_1$ taken out from the session key storage part 124 and the message key encrypted text $C^{(1)}_{1,K1}$, to decrypt the message key $K_1$ (S122).

The message decrypting part 123 of the communication terminal 12 calculates $m \leftarrow \text{Dec}(K_1, C_{2,m})$ from the decrypted message key $K_1$ and the message encrypted text $C_2,m$ based on the common key cryptosystem, to decrypt the message m (S123). By this means, the communication terminal 12 can correctly display the message m transmitted from the communication terminal 11.

<Operation of Communication Terminal 13>

Operation of the communication terminal 13 will be described below with reference to FIG. 8. It is assumed, for example, that the session key is updated from $SK_1$ to $SK_2$ in the group corresponding to the group ID. At this time, the communication terminal 11, the communication terminal 12 and the communication terminal 13 share the latest session key $SK_2$, and store the latest session key $SK_2$ respectively in the session key storage part 117, the session key storage part 124, and the session key storage part 133 (FIG. 8, sharing of a new session key). Further, it is assumed that the session key storage part 133 of the communication terminal 13 also holds the session key $SK_1$ before being updated.

Note that, because the session keys $SK_1$ and $SK_2$ are not shared with the server apparatus 10, the server apparatus 10 does not know the session keys $SK_1$ and $SK_2$.

Further, it is assumed that the server apparatus 10 holds the encrypted text associated with the group ID, that is, the encrypted text transmitted to the group identifier group ID, $C^{(1)}_{1,Ki1}, \ldots, C^{(1)}_{1,Kin}$ in the message key encrypted text storage part 103. Note that $i_1, \ldots, i_n$ are indexes for distinguishing the message key, in the description of the present embodiment.

As illustrated in FIG. 8, the re-encryption key generating part 131 of the communication terminal 13 calculates $RK_{1,2} \leftarrow \text{KEM.ReKeyGen}(SK_1, SK_2)$ from the session key $SK_1$ before being updated and the updated session key $SK_2$ to generate a re-encryption key $RK_{1,2}$ (S131).

The transmitting part 132 of the communication terminal 13 transmits a set of the group identifier group ID and the re-encryption key $RK_{1,2}$, that is, (group ID, $RK_{1,2}$) to the server apparatus 10 (S132).

<Re-Encryption Operation of Server Apparatus 10>

Re-encryption operation of the server apparatus 10 will be continuously described with reference to FIG. 8. The receiving part 101 of the server apparatus 10 receives the set of the group identifier group ID and the re-encryption key $RK_{1,2}$ (group ID, $RK_{1,2}$) from the communication terminal 13 (S101-3).

The re-encryption processing part 106 and the message key encrypted text storage part 103 of the server apparatus 10 repeatedly executes the following processing on each of $j \in \{i_1, \ldots, i_n\}$.

The message key encrypted text storage part 103 takes out the message key encrypted text $C^{(1)}_{1,Kj}$. The re-encryption processing part 106 executes $C^{(2)}_{1,Kj} \leftarrow \text{KEM.ReEnc}(RK_{1,2}, C^{(1)}_{1,Kj})$ from the re-encryption key $RK_{1,2}$ and the message key encrypted text $C^{(1)}_{1,Kj}$ corresponding to the group identifier group ID based on the common key cryptosystem which can perform re-encryption, to generate the re-encrypted message key encrypted text $C^{(2)}_{1,Kj}$ (S106).

The message key encrypted text storage part 103 overwrites the message key encrypted text $C^{(1)}_{1,Kj}$ and stores the re-encrypted message key encrypted text $C^{(1)}_{1,Kj}$ (S103-3).

Note that each message key identifier is not changed after this processing. Therefore, there is no change in correspondence relationship between the message encrypted text in the message encrypted text storage part 102 and the message key encrypted text in the message key encrypted text storage part 103.

The communication terminal which receives the encrypted text associated with the group ID delivered from the server apparatus 10 after the above-described processing can correctly decrypt each message through operation which is the same as that upon message reception if the communication terminal holds the latest session key $SK_2$.

<Reception of a Plurality of Messages>

There is a case where a plurality of messages such as 10 messages and 20 messages are received at one time upon log-in, upon addition of a group, or the like. Operation at that time will be described. Here, description will be provided assuming that the communication terminal 12 enters a predetermined group upon log-in and downloads the latest five messages. The server apparatus 10 extracts the latest five messages transmitted in the group from the message encrypted text storage part 102.

It is assumed that these are sequentially (Key $ID_1$, $C_{2,m1}$), (Key $ID_1$, $C_{2,m2}$), (Key $ID_2$, $C_{2,m3}$), (Key $ID_1 C_{2,m4}$) and (Key $ID_3$, $C_{2,m5}$) from the newest one. Because the message key identifiers included in the extracted messages are three types of Key $ID_1$, Key $ID_2$ and Key $ID_3$, the server apparatus 10 extracts sets of the message key identifiers and the message key encrypted texts (Key $ID_1$, $C_{1,K1}$), (Key $ID_2$, $C_{1,K2}$) and (Key $ID_3$, $C_{1,K3}$) from the message key encrypted text storage part 103.

The server apparatus 10 transmits sets of the message key identifiers and the message key encrypted texts (Key $ID_1$, $C_{1,K1}$), (Key $ID_2$, $C_{1,K2}$) and (Key $ID_3$, $C_{1,K3}$) and sets of the message key identifiers and the message encrypted texts (Key $ID_1$, $C_{2,m1}$), (Key $ID_1$, $C_{2,m2}$), (Key $ID_2$, $C_{2,m3}$), (Key $ID_1$, $C_{2,m4}$) and (Key $ID_3$, $C_{2,m5}$) to the communication terminal 12.

The communication terminal 12 which has received the sets of the message key identifiers and the message key encrypted texts (Key $ID_1$, $C_{1,K1}$), (Key $ID_2$, $C_{1,K2}$) and (Key $ID_3$, $C_{1,K3}$) and sets of the message key identifiers and the message encrypted texts (Key $ID_1$, $C_{2,m1}$), (Key $ID_1$, $C_{2,m2}$), (Key $ID_2$, $C_{2,m3}$), (Key $ID_1$, $C_{2,m4}$) and (Key $ID_3$, $C_{2,m5}$) takes out the latest session key $SK_1$ from the session key storage part 124.

The message key decrypting part 122 of the communication terminal 12 calculates each of $K_1 \leftarrow \text{KEM.Dec}(SK_1, C_{1,K1})$, $K_2 \leftarrow \text{KEM.Dec}(SK_1, C_{1,K2})$, and $K_3 \leftarrow \text{KEM.Dec}(SK_1, C_{1,K3})$ to decrypt the message keys $K_1$, $K_2$ and $K_3$, and temporarily stores each of sets of the message key identifiers and the message keys (Key $ID_1$, $K_1$), (Key $ID_2$, $K_2$) and (Key $ID_3$, $K_3$) in the message key storage part 125.

Then, a message is decrypted. Because the message encrypted text is acquired in combination with the message key identifier, decryption processing is performed by extracting the corresponding message key. That is, the message decrypting part 123 calculates $m_1 \leftarrow \text{Dec}(K_1, C_2,m_1)$, $m_2 \leftarrow \text{Dec}(K_1, C_2,m_2)$, $m_3 \leftarrow \text{Dec}(K_2, C_2,m_3)$, $m_4 \leftarrow \text{Dec}(K_1, C_2,m_4)$ and $m_5 \leftarrow \text{Dec}(K_3, C_2,m_5)$ to decrypt each message. By this means, it is possible to reduce processing of decrypting the message key encrypted text for each message, so that it is possible to correctly display each message. Note that it is desirable in terms of security to delete all sets of the message key identifiers and the message keys stored in the message key storage part 125 after all the messages are acquired.

<Supplementary Note>

The apparatus of the present invention includes, for example, as single hardware entity, an input part to which a keyboard, or the like, can be connected, an output part to which a liquid crystal display, or the like, can be connected, a communication part to which a communication apparatus (for example, a communication cable) which can perform communication with outside of the hardware entity, can be connected, a CPU (Central Processing Unit, which may include a cash memory, a resistor, or the like), a RAM and a ROM which are memories, an external storage apparatus which is a hard disk, and a bus which connects these input part, output part, communication part, CPU, RAM, ROM and external storage apparatus so that data can be exchanged. Further, as necessary, an apparatus (drive), or the like, which can perform read/write in a recording medium such as a CD-ROM may be provided at the hardware entity. Examples of physical entity including such hardware resources can include a general-purpose computer, or the like.

In the external storage apparatus which is the hardware entity, programs which are required for realizing the above-described functions, data which is required in processing of this program, or the like, are stored (the programs and the data may be stored in, for example, a ROM which is a read-only storage apparatus for reading out the programs, as well as in the external storage apparatus). Further, data, or the like, which can be obtained through processing of these program are stored in the RAM, the external storage apparatus, or the like, as appropriate.

In the hardware entity, each program stored in the external storage apparatus (or a ROM, or the like) and data required for processing of each program are loaded to the memory as necessary, and interpreted, executed, and processed as appropriate at the CPU. As a result, the CPU realizes predetermined functions (respective components expressed as the above-described . . . part, . . . means, or the like).

The present invention is not limited to the above-described embodiment, and can be changed as appropriate within a range not deviating from the gist of the present invention. Further, the processing described in the above-described embodiment may be executed in parallel or individually in accordance with processing capability of an apparatus which executes the processing or as necessary as well as being executed in chronological order in accordance with the order of description.

As described above, in a case where processing functions in the hardware entity (the apparatus of the present invention) described in the above-described embodiment is realized with a computer, processing content of the functions which the hardware entity should have is described by a program. Then, by this program being executed at the computer, the processing functions at the above-described hardware entity are realized on the computer.

The program which describes this processing content can be recorded in a computer-readable recording medium. The computer-readable recording medium may be, for example, a magnetic recording apparatus, an optical disk, a magnetooptical recording medium, a semiconductor memory, or the like. Specifically, for example, a hard disk apparatus, a flexible disk, a magnetic tape, or the like, can be used as the magnetic recording apparatus, a DVD (Digital Versatile Disc), a DVD-RAM (Random Access Memory), a CD-ROM (Compact Disc Read Only Memory), a CD-R (Recordable)/RW (ReWritable), or the like, can be used as the optical disk, an MO (Magneto-Optical disc), or the like, can be used as a magnetooptical recording medium, and an EEP-ROM (Electronically Erasable and Programmable-Read Only Memory), or the like, can be used as the semiconductor memory.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage apparatus of a server computer and transferred from the server computer to other computers via a network.

A computer which executes such a program, for example, first, stores a program recorded in the portable recording medium or a program transferred from the server computer in the storage apparatus of the own computer once. Then, upon execution of processing, this computer reads out the program stored in the recording medium of the own computer and executes processing in accordance with the read program. Further, as another execution form of this program, the computer may directly read a program from the portable recording medium and execute processing in accordance with the program, and, further, sequentially execute processing in accordance with the received program every time the program is transferred from the server computer to this computer. Further, it is also possible to employ a configuration where the above-described processing is executed by so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the hardware entity is constituted by a predetermined program being executed on the computer, at least part of the processing content may be realized with hardware.

What is claimed is:

1. A communication terminal which transmits an encrypted text to another communication terminal via a server apparatus, the communication terminal comprising:
processing circuitry configured to:
store a session key which is shared with the other communication terminal and which is not shared with the server apparatus;
perform a determination to newly generate a message key for encrypting a message when transmission of the encrypted text is a first transmission after the session key is first generated or updated;
perform a determination to reutilize a previous message key when transmission of the encrypted text is not a first transmission after the session key is first generated or updated;
generate the message key when the processing circuitry performs of the determination to newly generate a message key;
store the message key to be reutilized in association with a message key identifier when the processing circuitry performs the determination to reutilize a previous message key;

generate an encrypted message text based on a common key cryptosystem using the message and the generated or stored message key;

generate an encrypted message key text based on a common key cryptosystem which performs re-encryption using the session key and the generated message key where the result of the determination is to newly generate a message key; and transmit a group identifier, the encrypted message key text, and the encrypted message text to the server apparatus where the result of the determination is to newly generate a message key, and transmit the group identifier, the message key identifier and the encrypted message text to the server apparatus where the result of the determination is to reutilize the message key, wherein the group identifier identifies a group to which the communication terminal belongs.

2. A non-transitory computer readable medium that stores a program for causing a computer to function as a communication terminal comprising:

processing circuitry configured to:

transmit an encrypted text to another computer terminal via a server apparatus;

store a session key which is shared with the other communication terminal and which is not shared with the server apparatus;

perform a determination to newly generate a message key for encrypting a message when transmission of the encrypted text is a first transmission after the session key is first generated or updated;

perform a determination to reutilize a previous message key when transmission of the encrypted text is not a first transmission after the session key is first generated or updated;

generate the message key when the processing circuitry performs the determination to newly generate a message key;

store the message key to be reutilized in association with a message key identifier when the processing circuitry performs the determination to reutilize a previous message key;

generate an encrypted message text based on a common key cryptosystem using the message and the generated or stored message key;

generate an encrypted message key text based on a common key cryptosystem which performs re-encryption using the session key and the generated message key where the result of the determination is to newly generate a message key; and transmit a group identifier, the encrypted message key text, and the encrypted message text to the server apparatus where the result of the determination is to newly generate a message key, and transmit the group identifier, the message key identifier and the encrypted message text to the server apparatus where the result of the determination is to reutilize the message key, wherein the group identifier identifies a group to which the computer belongs.

* * * * *